(12) United States Patent
Wang

(10) Patent No.: US 8,718,175 B2
(45) Date of Patent: May 6, 2014

(54) CHANNEL QUALITY INDICATOR

(75) Inventor: Gang Wang, Bristol (GB)

(73) Assignee: NVIDIA Corporation, Santa Clara, CA (US)

( * ) Notice: Subject to any disclaimer, the term of this patent is extended or adjusted under 35 U.S.C. 154(b) by 58 days.

(21) Appl. No.: 13/598,245

(22) Filed: Aug. 29, 2012

(65) Prior Publication Data

US 2014/0044156 A1    Feb. 13, 2014

(30) Foreign Application Priority Data

Aug. 13, 2012  (GB) .................................. 1214430.9

(51) Int. Cl.
*H04B 7/02*   (2006.01)

(52) U.S. Cl.
USPC .......................................................... 375/267

(58) Field of Classification Search
USPC ......................................... 375/267, 295, 296
See application file for complete search history.

(56) References Cited

U.S. PATENT DOCUMENTS

| | | | |
|---|---|---|---|
| 8,594,222 B1 * | 11/2013 | Sun et al. ...................... | 375/267 |
| 2006/0128340 A1 | 6/2006 | Hsieh et al. | |
| 2009/0280766 A1 | 11/2009 | Rofougaran et al. | |
| 2013/0034180 A1 * | 2/2013 | Liu et al. ...................... | 375/267 |
| 2013/0148755 A1 * | 6/2013 | Melzer et al. .................. | 375/267 |

FOREIGN PATENT DOCUMENTS

| | | |
|---|---|---|
| DE | 3337030 C2 | 5/1985 |
| JP | 2000013357 A | 1/2000 |
| WO | 2004109941 A1 | 12/2004 |
| WO | 2008112800 A2 | 9/2008 |

OTHER PUBLICATIONS

Patents Act 1977: Search Report Under Section 17, GB Application No. 1214430.9, Nov. 26, 2012, 4 pages.
Mehlfuhrer, C., et al., "Joint Throughput Optimized CQI and Precoding Weight Calculation for MIMO HSDPA," IEEE Signals, Systems and Computers, 2008 42nd Asilomar Conference, Oct. 26-28, 2008, pp. 1320-1325.
Gianni, F., et al., "High-Q gyrator-based monolithic active tunable bandstop filter," IEEE Proceedings-Circuits Devices Syst., vol. 145, No. 4, Aug. 1998, pp. 243-246.
Park, S., et al., "An Improved Wide-Dynamic Range Tunable RF Interference Suppression Notch Filter," IEEE, 2010, pp. 1033-1036.
Combined Search and Examination Report under Sections 17 and 18(3), GB Application No. 1206897.9, Aug. 20, 2012, 8 pages.

* cited by examiner

*Primary Examiner* — Jaison Joseph

(57) ABSTRACT

A method, a receiver and computer program product for reporting at least one channel quality indicator from a receiver to a transmitter in a MIMO system are disclosed herein. In one embodiment, the receiver receives one or more data streams transmitted by the transmitter wherein the data streams are processed by the transmitter using a transmission precoding matrix W prior to transmission to the receiver. The receiver estimates a preferred precoding matrix $W_p$ which is preferred by the receiver and processes the received data streams using the transmission precoding matrix W, such that the effective channel G at the output of the signal processing module is dependent upon the transmission precoding matrix W used by the transmitter. The receiver determines a second effective channel $G_p$, uses it to determine the at least one channel quality indicator and transmits the determined at least one channel quality indicator to the transmitter.

20 Claims, 6 Drawing Sheets

CHANNEL QUALITY INDICATOR

CROSS REFERENCE TO RELATED APPLICATION

This application claims priority from patent application GB 1214430.9 entitled "Channel Quality Indicator," filed on Aug. 13, 2012, by Gang Wang, and incorporated herein by reference in its entirety.

TECHNICAL FIELD

The disclosure relates to a channel quality indicator. In particular, the disclosure relates to reporting a channel quality indicator from a receiver to a transmitter.

BACKGROUND

In a Multiple-Input Multiple-Output (MIMO) system, spatial multiplexing allows the transmission of multiple data streams (or data layers) over different spatial channels. Multiple transmit antennas can send different data streams over separate spatial channels, and the use of multiple receive antennas can allow the recovery of the different data streams. FIG. 1 shows a 2×2 MIMO communication system in which two transmit antennas (Tx $Ant_1$ and Tx $Ant_2$) transmit signals to two receive antennas (Rx $Ant_1$ and Rx $Ant_2$). As shown schematically in FIG. 1, each transmit antenna (Tx Ant) transmits to all receive antennas (Rx Ant) at the receiver. In other MIMO communication systems any number of transmit antennas and receive antennas may be used, and the maximum number of data streams that can be distinguished due to the spatial multiplexing is equal to the lower of the number of transmit antennas and the number of receive antennas.

The transmission system shown in FIG. 1 can be described by the equation $$r = Hx + n \quad (1)$$

where r denotes the received signal vector, x is the transmitted signal vector, H indicates the MIMO channel matrix, and n is the noise (noise-plus-interference) vector. The channel matrix H models the characteristics of the MIMO propagation channel. In the case of a frequency non-selective channel, Equation (1) can be expanded for a 2×2 MIMO channel as $$\begin{bmatrix} r_1 \\ r_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix}, \quad (2)$$

where $r_1$ and $r_2$ are the signals received at the respective receive antennas Rx $Ant_1$ and RX $Ant_2$; $x_1$ and $x_2$ are the signals transmitted from the respective transmit antennas Tx $Ant_1$ and Tx $Ant_2$; $h_{11}$, $h_{12}$, $h_{21}$ and $h_{22}$ are the coefficients of the (frequency non-selective) MIMO channel; and $n_1$ and $n_2$ are the noise (noise-plus-interference) at the respective receive antennas Rx $Ant_1$ and Rx $Ant_2$.

In one system, the transmitter uses a precoding matrix W to process N data streams for transmission to the receiver in the MIMO system. The transmitter signals to the receiver the values of W and N that have been used, thereby enabling the receiver to correctly decode the data streams. For example, the receiver may implement an equalizer as part of the decoding process for decoding the received data streams. An effective channel G at the output of the equalizer is calculated using the values of W and N indicated by the transmitter.

The receiver estimates its currently preferred precoding matrix $W_p$, its preferred number of data streams $N_p$ to be used in the MIMO system and a channel quality indicator (CQI) for each of the $N_p$ data streams corresponding to $N_p$ distinct transport blocks. The receiver reports these parameters ($W_p$, $N_p$ and the CQI(s)) to the transmitter. Although the values of $W_p$ and $N_p$ are reported to the transmitter, the transmitter may use different values for the precoding matrix W and the number of transmitted data streams N when processing the data streams for transmission to the receiver. In other words, W may be different to $W_p$, and N may be different to $N_p$.

In the system described above, the CQI(s) are calculated at the receiver based on an effective channel $G_p$ that would be seen at the output of the equalizer if the transmitter used the preferred precoding matrix $W_p$ and the preferred number of data streams $N_p$ (that is, if $W=W_p$ and $N=N_p$).

SUMMARY

In a first aspect, the disclosure provides a method of reporting at least one channel quality indicator from a receiver to a transmitter, the method including operations implemented at the receiver. In one embodiment the operations include: (1) receiving one or more data streams transmitted by the transmitter in a Multiple-Input Multiple-Output system, wherein the data streams are processed by the transmitter using a transmission precoding matrix W prior to transmission of the data streams to the receiver, (2) estimating a preferred precoding matrix $W_p$ which is preferred by the receiver, (3) processing the received data streams with a signal processing module using the transmission precoding matrix W, such that the effective channel G at the output of the signal processing module is dependent upon the transmission precoding matrix W used by the transmitter, (4) determining a second effective channel $G_p$ which is based on the preferred precoding matrix $W_p$ by: (i) determining a relationship between the effective channel G and the second effective channel $G_p$ based on the transmission precoding matrix W and the preferred precoding matrix $W_p$; and (ii) using the determined relationship and the effective channel G at the output of the signal processing module to determine the second effective channel $G_p$, (5) using the determined second effective channel $G_p$ to determine the at least one channel quality indicator and (6) transmitting the determined at least one channel quality indicator to the transmitter.

In a second aspect, the disclosure provides a receiver configured to report at least one channel quality indicator to a transmitter. In one embodiment the receiver includes: (1) transceiver apparatus configured to receive one or more data streams transmitted by the transmitter in a Multiple-Input Multiple-Output system, wherein the data streams are processed by the transmitter using a transmission precoding matrix W prior to transmission of the data streams to the receiver, (2) a signal processing module configured to process the received data streams using the transmission precoding matrix W, such that the effective channel G at the output of the signal processing module is dependent upon the transmission precoding matrix W used by the transmitter and (3) processing apparatus configured to: (3A) estimate a preferred precoding matrix $W_p$ which is preferred by the receiver, (3B) determine a second effective channel $G_p$ which is based on the preferred precoding matrix $W_p$ by: (i) determining a relationship between the effective channel G and the second effective channel $G_p$ based on the transmission precoding matrix W and the preferred precoding matrix $W_p$; and (ii) using the determined relationship and the effective channel G at the output of the signal processing module to determine the second effective channel $G_p$ and (3C) use the determined second effective channel $G_p$ to determine the at least one channel quality indicator, wherein the transceiver apparatus is further configured to transmit the determined at least one channel quality indicator to the transmitter.

In a third aspect, there is provided a computer program product configured to report at least one channel quality indicator from a receiver to a transmitter, the computer program product being embodied on a non-transient computer-readable medium and configured so as when executed by a processor of the receiver to implement operations at the receiver. In one embodiment the operations include: (1) receiving one or more data streams transmitted by the transmitter in a Multiple-Input Multiple-Output system, wherein the data streams are processed by the transmitter using a transmission precoding matrix W prior to transmission of the data streams to the receiver, (2) estimating a preferred precoding matrix $W_p$ which is preferred by the receiver, (3) processing the received data streams with a signal processing module using the transmission precoding matrix W, such that the effective channel G at the output of the signal processing module is dependent upon the transmission precoding matrix W used by the transmitter, (4) determining a second effective channel $G_p$ which is based on the preferred precoding matrix $W_p$, (5) using the determined second effective channel $G_p$ to determine the at least one channel quality indicator and (6) transmitting the determined at least one channel quality indicator to the transmitter.

BRIEF DESCRIPTION

Reference is now made to the following descriptions taken in conjunction with the accompanying drawings, in which.

DETAILED DESCRIPTION

Figure 1:
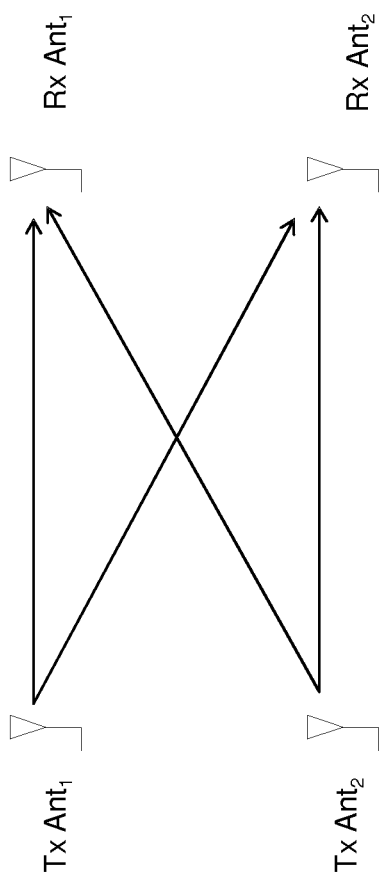
FIG. 1 shows a 2×2 MIMO communication system.

There may be difficulties in calculating the CQI(s) to be reported from a receiver to a transmitter when the values of W and/or N are not the same as the values of $W_p$ and/or $N_p$ respectively. In these cases the receiver may process the received data streams using, for example, an equalizer, thereby determining an effective channel G at the output of the equalizer. However, another, different, effective channel $G_p$ would need to be computed in the systems for the purpose of CQI estimation described in the background section above, based on the values of $W_p$ and $N_p$. The extra computation of $G_p$ (in addition to the computation of G) will increase the time, power, and processing resources required at the receiver in order to calculate the CQI(s) to be reported to the transmitter.

Additionally, the extra computation of $G_p$ using the systems described in the background section above (in addition to the computation of G) can be detrimental. There is, therefore, provided herein a simple process for estimating the CQI(s) for a MIMO stream. The simple estimation may be used in any MIMO system which needs the estimation of CQI, and is particularly accurate when the transmitted data correlation matrix $R_{dd}$ is equal to, or can be approximated as, a scaled identity matrix $\sigma_d^2 I$, where $\sigma_d$ represents the strength of the received data streams. The transmitted data correlation matrix can be approximated as a scaled identity matrix in most practical cases. For example, in a 2×2 MIMO system, the transmitted data correlation matrix can be approximated as a scaled identity matrix when the transmitter transmits two data streams to a single receiver in a single-user MIMO system, or when two separate streams are simultaneously transmitted to two different receivers in a multi-user MIMO system. The estimation avoids the need to implement a full computation of $G_p$ based on $W_p$ in an equivalent manner to that by which G is computed based on W. In some cases where the transmitted data correlation matrix is not close to a scaled identity matrix, the methods described herein can still be applied to obtain a reduced implementation complexity, accepting a performance degradation, which could be relatively small.

Disclosed herein, the effective channel G is determined at the receiver as part of the processing of the received data streams. The effective channel $G_p$ can be determined by determining a relationship (e.g. a transformation) between G and $G_p$, wherein the relationship is based on the values of W and $W_p$. The CQI(s) are determined using $G_p$, so there is provided a simple way to determine and report the CQI(s) from the receiver to the transmitter.

As noted above, the disclosure provides a method of reporting at least one channel quality indicator from a receiver to a transmitter, wherein the method includes operations implemented at the receiver. In some embodiments the receiver is user equipment and the transmitter is a base station. In one embodiment, the method includes processing received data streams with a signal processing module that may be one of: (i) a Multiple-Input Multiple-Output equalizer, and (ii) a rake receiver processing module for the Multiple-Input Multiple-Output system.

The method may include determining whether a transmitted data correlation matrix $R_{dd}$ is equal to, or can be approximated as, a scaled identity matrix $\sigma_d^2 I$, where $\sigma_d$ represents the strength of the received data streams, wherein responsive to determining that the transmitted data correlation matrix $R_{dd}$ is equal to, or can be approximated as, a scaled identity matrix $\sigma_d^2 I$ the determining a second effective channel $G_p$ is implemented by the (i) determining a relationship between the effective channel G and the second effective channel $G_p$, and the (ii) using the determined relationship and the effective channel G at the output of the signal processing module to determine the second effective channel $G_p$.

The method may further include receiving an indication of the number of data streams transmitted from the transmitter in the Multiple Input Multiple Output system to the receiver. An indication of the transmission precoding matrix W may be received by the receiver from the transmitter on a control channel. The number of data streams transmitted from the transmitter in the Multiple Input Multiple Output system to the receiver may be two.

In one embodiment, the method includes processing received data streams with a signal processing module including implementing a Minimum Mean Square Error estimation. For example, the signal processing module may be one of: (i) a Multiple-Input Multiple-Output equalizer, and (ii) a rake receiver processing module for the Multiple-Input Multiple-Output system.

In one embodiment the method includes determining a relationship between the effective channel G and the second effective channel $G_p$ wherein the relationship may be a transformation between the effective channel G and the second effective channel $G_p$. For example, the transformation may be given by:

$$G_p = TGT^H,$$

where $T = W_p^H W$, and where the superscript H denotes a Hermitian transpose operation.

The effective channel G may be given by:

$$G = FHW,$$

where the matrix H is a Multiple-Input Multiple-Output channel matrix between the transmitter and the receiver in the frequency domain, and where the Minimum Mean Square Error (MMSE) equaliser F is:

$$F = W^H H^H (HH^H + \rho^{-1} I)^{-1},$$

where the superscript H denotes a Hermitian transpose operation, I is the identity matrix and $\rho$ represents the signal to noise ratio between the transmitter and the receiver.

The computation of $T = W_p^H W$ can be simplified for most of MIMO systems where the precoding matrix W is selected from a limited set of matrices. For example, in the case of the 2×2 MIMO used by the Third Generation Partnership Project (3GPP), Frequency-division duplexing (FDD), Wideband Code Division Multiple Access (WCDMA)/High-Speed Downlink Packet Access (HSDPA) protocol as an example, the transmission precoding matrix W and the preferred precoding matrix $W_p$ may be given by:

$$W = \frac{1}{\sqrt{2}} \begin{bmatrix} 1 & 1 \\ e^{i\alpha} & e^{-i\alpha} \end{bmatrix} \text{ and } W_p = \frac{1}{\sqrt{2}} \begin{bmatrix} 1 & 1 \\ e^{i\beta} & e^{-i\beta} \end{bmatrix},$$

where $$\alpha = \frac{\pi}{4} + \frac{k\pi}{2} \text{ and } \beta = \frac{\pi}{4} + \frac{m\pi}{2},$$

and where $k \in \{0, 1, 2, 3\}$ and $m \in \{0, 1, 2, 3\}$, and wherein the step of determining a relationship between the effective channel G and the second effective channel $G_p$ comprises determining a value of $\delta$, where:

$$\delta = (k-m) \text{ modulo } 4.$$

In some embodiments:

if $\delta = 0$ the receiver determines the second effective channel $G_p$ according to a relationship $G_p = G$;

if $\delta = 1$ the receiver determines the second effective channel $G_p$ according to a relationship $G_p = T_2 G T_2^H$, where $$T_2 = \frac{1}{2} \begin{bmatrix} 1+i & 1-i \\ 1-i & 1+i \end{bmatrix};$$

if $\delta = 2$ the receiver determines the second effective channel $G_p$ according to a relationship $G_p = T_3 G T_3^H$, where $$T_3 = \begin{bmatrix} 0 & 1 \\ 1 & 0 \end{bmatrix};$$

and if $\delta = 3$ the receiver determines the second effective channel $G_p$ according to a relationship $$G_p = \begin{bmatrix} 0 & 1 \\ 1 & 0 \end{bmatrix} T_2 G T_2^H \begin{bmatrix} 0 & 1 \\ 1 & 0 \end{bmatrix}.$$

The effective channel G and the second effective channel $G_p$ may be in one of: (i) the frequency domain, and (ii) the time domain.

The disclosure will now describe embodiments by way of example only. In some of the following descriptions, a 2×2 MIMO configuration is used as an example, but the principle applies generally to any MIMO system which needs CQI estimation.

Figure 2:
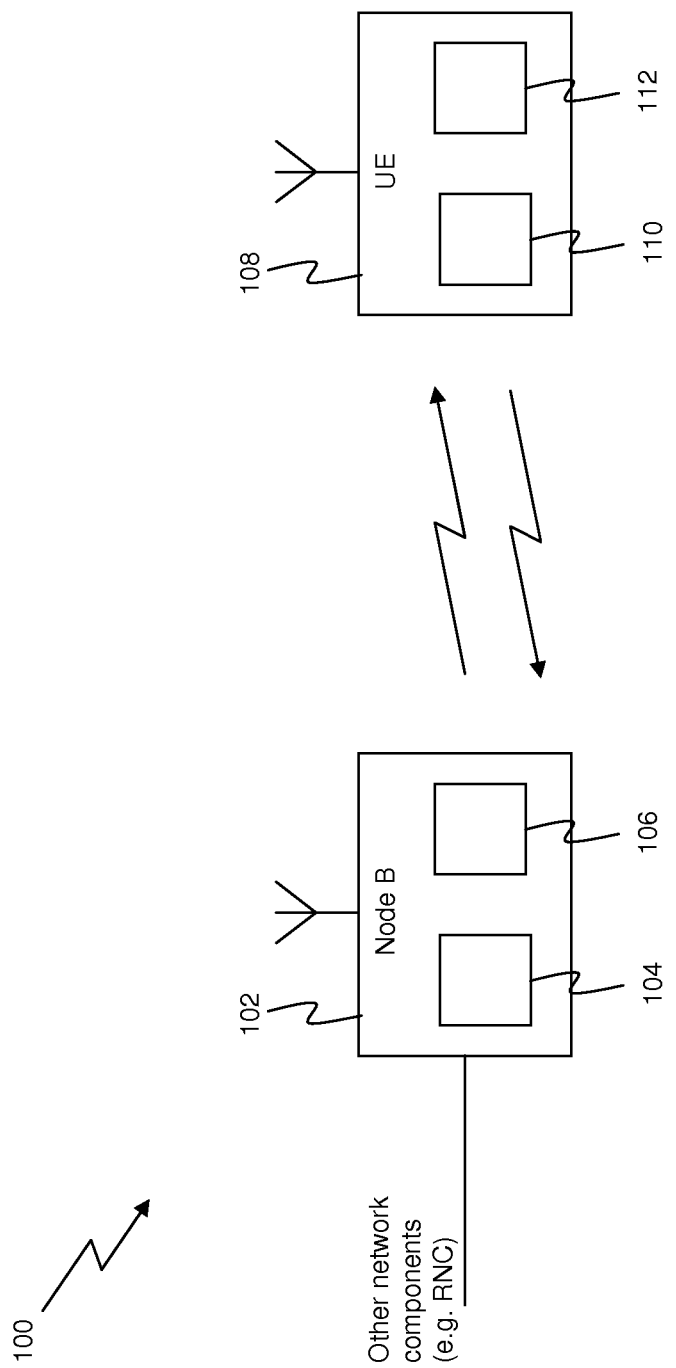
FIG. 2 shows a diagram of an embodiment of a communication system according to the principles of the disclosure.

FIG. 2 shows a block diagram of an embodiment of a MIMO communication system 100, such as according to the Third Generation Partnership Project (3GPP) MIMO for High-Speed Downlink Packet Access (HSDPA) protocol. The system 100 includes a base station 102 (or "Node B"), which itself includes a processor 104 for processing data and a memory 106 for storing data. The system 100 also includes user equipment (UE) 108 which also includes a processor 110 for processing data and a memory 112 for storing data. In preferred embodiments the UE 108 is a mobile device. The base station 102 is connected to other components (e.g. a Radio Network Controller) of a wireless network (e.g. a radio access network) which may operate for example according to the 3GPP protocols. The base station 102 is configured to transmit and receive wireless signals to and from UEs, such as the UE 108, which are within the coverage area of the base station 102. The base station 102 is also arranged to transmit and receive data to and from the other components of the wireless network. In this way the base station 102 allows the UE 108 (and other UEs within the coverage area of the base station 102) to communicate with the wireless network, e.g. to thereby communicate with other UEs in the wireless network.

The base station 102 and the UE 108 are arranged to implement a MIMO system, such as that shown in FIG. 1 whereby the base station 102 has multiple antennas (e.g. Tx $Ant_1$ and Tx $Ant_2$) for simultaneously transmitting multiple data signals to the UE 108, and the UE 108 has multiple antennas (e.g. Rx $Ant_1$ and Rx $Ant_2$) for receiving the multiple data signals from the base station 102.

Figure 3:
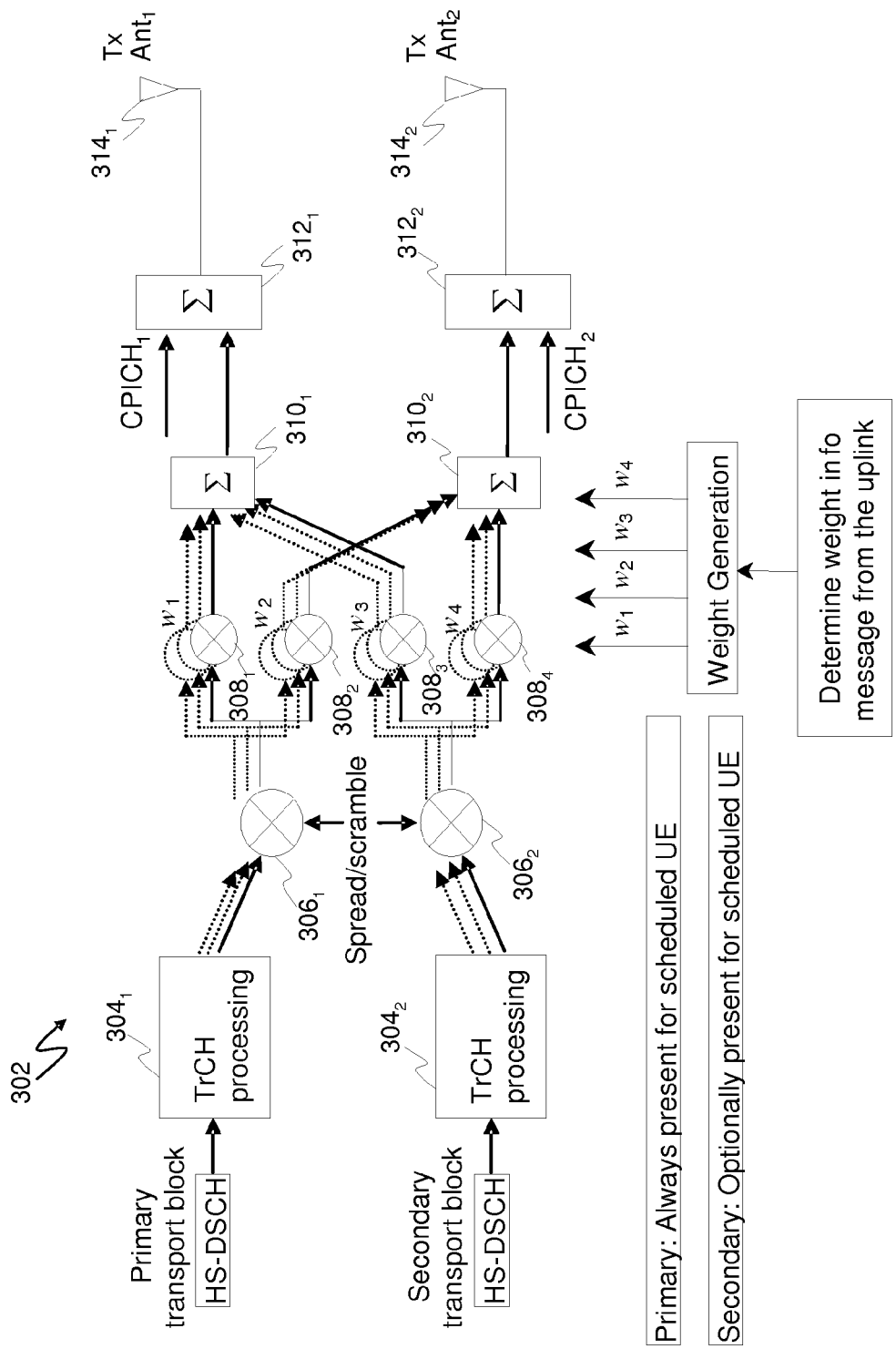
FIG. 3 shows a functional schematic diagram of an embodiment of a transmitter.

FIG. 3 shows a functional schematic diagram of the transmit path 302 implemented in the base station 102 for transmitting two data streams to the UE 108. A primary transport block (TB) is received at a first processing block 304. in the example shown in FIG. 3, the primary TB and the secondary TB are arranged in accordance with the High-Speed Downlink Shared Channel (HS-DSCH) protocol. As is known in the art, the outputs of the processing blocks $304_1$ and $304_2$ are spread or "scrambled" by respective spreading means $306_1$ and $306_2$.

The spread complex valued signals are fed to both TX antenna branches, and weighted with weighting means $308_1$, $308_2$, $308_3$ and $308_4$ with respective precoding weights $w_1$, $w_2$, $w_3$ and $w_4$. In particular, the output of the spreading means $306_1$ is input to the weighting means $308_1$ and to the weighting means $308_2$. The output of the spreading means $306_2$ is input to the weighting means $308_3$ and to the weighting means $308_4$. The precoding weights $w_1$ and $w_3$ are constant real valued scalars and the precoding weights $w_2$ and $w_4$ are variable complex valued scalars. The precoding weights $w_1$, $w_2$, $w_3$ and $w_4$ are defined according to the 3GPP specification TS 25.214 as follows:

$$w_3 = w_1 = 1/\sqrt{2},$$

$$w_4 = -w_2,$$

$$w_2 \in \left\{ \frac{1+j}{2}, \frac{1-j}{2}, \frac{-1+j}{2}, \frac{-1-j}{2} \right\},$$

and the precoding matrix W is given by:

$$W = \begin{bmatrix} w_1 & w_3 \\ w_2 & w_4 \end{bmatrix}.$$

If single-stream restriction is configured, or single-stream restriction is not configured and the base station 102 schedules a single transport block in a cell to the UE 108 in one Transmission Time Interval (TTI), the base station 102 uses the precoding vector (w1, w2) for transmission of that transport block. If single-stream restriction is not configured and two transport blocks are scheduled in a cell to the UE 108 in one TTI, the base station 102 uses two orthogonal precoding vectors to transmit the two transport blocks. The precoding vector (w1, w2) is called the primary precoding vector which is used for transmitting the primary transport block and the precoding vector (w3, w4) is called secondary precoding vector which is used for transmitting the secondary transport block, respectively. A summation block $310_1$ sums the outputs from the weighting means $308_1$ and $308_3$ and provides an output to another summation block $312_1$. The summation block $312_1$ combines the output of the summation block $310_1$ with a first common pilot channel ($CPICH_1$) and the resulting data stream is transmitted from the antenna $314_1$ ($Tx Ant_1$). A summation block $310_2$ sums the outputs from the weighting means $308_2$ and $308_4$ and provides an output to another summation block $312_2$. The summation block $312_2$ combines the output of the summation block $310_2$ with a second common pilot channel ($CPICH_2$) and the resulting data stream is transmitted from the antenna $314_2$ ($Tx Ant_2$). The values of $w_1$, $w_2$, $w_3$ and $w_4$ in the precoding matrix W are determined based on information received from the UE 108 on an uplink channel.

Figure 4:
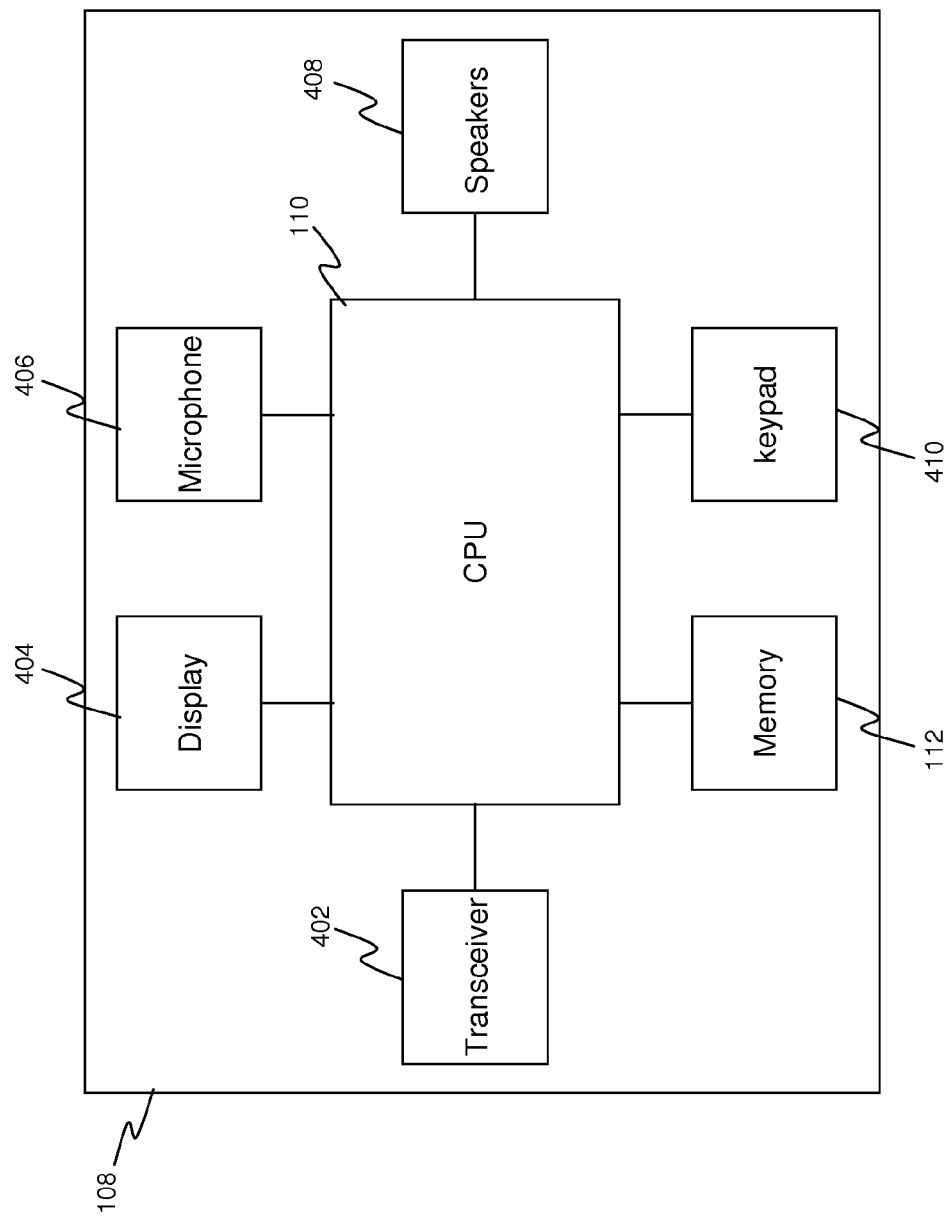
FIG. 4 shows a schematic view of an embodiment of a receiver.

FIG. 4 illustrates a detailed schematic view of an embodiment of the UE 108 which is configured to communicate with the base station 102. The UE 108 comprises a central processing unit ("CPU") 110, to which is connected: output devices such as a display 404 and speakers 408; input devices such as a keypad 410 and a microphone 406; a memory 112 for storing data; and transceiver apparatus 402 including the antennas $Rx Ant_1$ and $Rx Ant_2$ for transmitting and receiving data wirelessly. In particular, the transceiver apparatus 402 is operable to receive data from the base station 102 and to transmit data to the base station 102. The UE 108 may comprise other elements than those shown in FIG. 4. The display 404, microphone 406, speakers 408, keypad 410, memory 112 and transceiver apparatus 402 may be integrated into the UE 108 as shown in FIG. 4. In alternative UEs one or more of the display 404, microphone 406, speakers 408, keypad 410, memory 112 and transceiver apparatus 402 may not be integrated into the UE and may be connected to the CPU 110 via respective interfaces. One example of such an interface is a USB interface.

Figure 5:
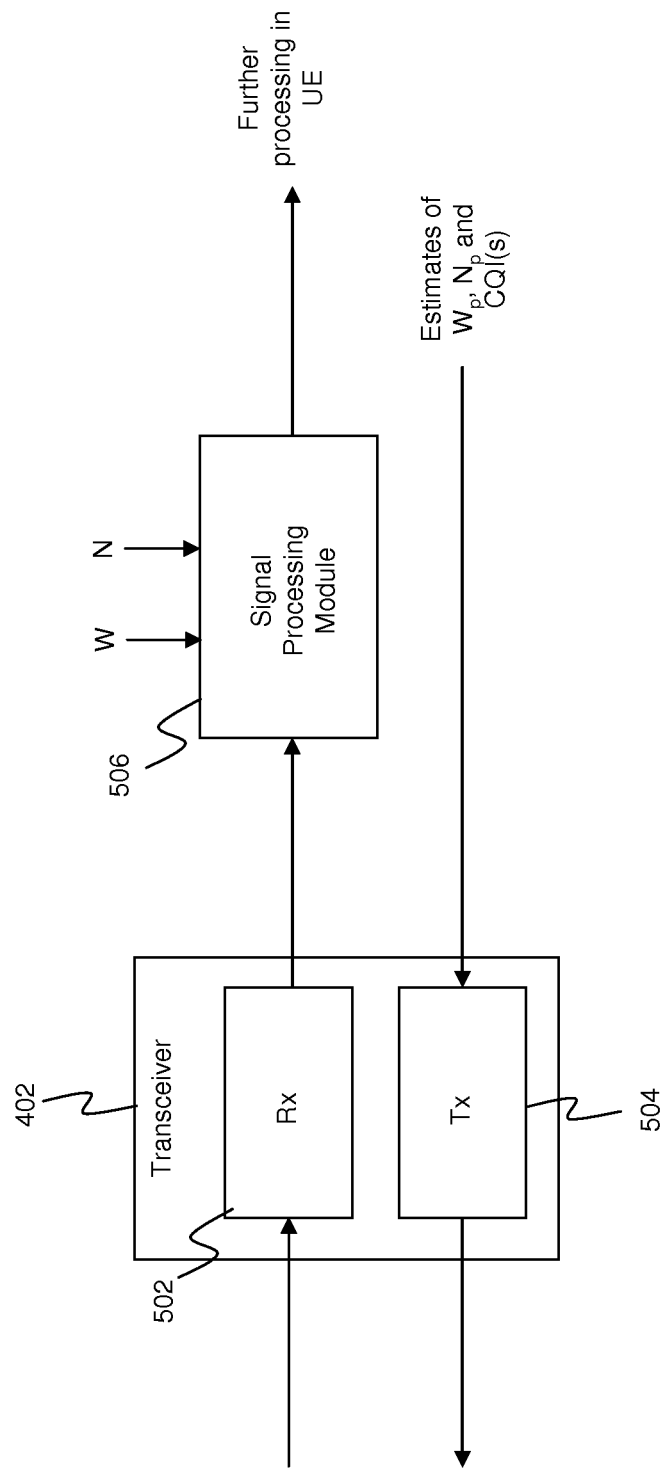
FIG. 5 shows a functional schematic diagram of an embodiment of a receiver.

FIG. 5 shows a functional schematic view of an embodiment of the UE 108 configured to receive and transmit signals wirelessly from and to the base station 102. The transceiver apparatus 402 of the UE 108 includes a receive module 502 configured to receive signals from the base station 102, and a transmit module 504 configured to transmit signals to the base station 102. The UE 108 also includes a signal processing module 506 which is arranged to receive signals from the receive module 502, process the data and output the processed data for further processing in the UE 108. The signal processing module 506 is arranged to receive the values of W and N as inputs. The signal processing module 506 may for example implement a Minimum Mean Square Error estimation in order to process the received data streams and to interpret the data coded therein. The signal processing module 506 may for example, be a MIMO equalizer or a rake receiver processing module.

As described in more detail below, the UE is configured to estimate its currently preferred precoding matrix $W_p$, its preferred number of streams $N_p$, and the Channel Quality Indicator (CQI) for each of the $N_p$ data streams corresponding to $N_p$ distinct transport blocks (TBs). The estimates of $W_p$, $N_p$ and the CQI(s) are provided to the transmit module 504 for transmission to the base station 102. The UE 108 is configured to report these parameters to the base station 102 on the uplink High-Speed Dedicated Physical Control Channel (HS-DPCCH).

The base station 102 uses the received information of W and of the CQI(s) of the $N_p$ distinct data streams of TBs, in order to choose to transmit N data streams (i.e. N distinct TBs) to the UE 108 with the precoding matrix W applied on the TBs, as shown in FIG. 3. As described above, the number of transmitted data streams N and the precoding matrix W used by the base station 102 may be different respectively from the number of data streams $N_p$ and the precoding matrix $W_p$ preferred by the UE 108. The base station 102 signals to the UE 108 its decision on W, number of streams N, and other information on a High-Speed Shared Control Channel (HS-SCCH), starting two slots before the start of the corresponding High-Speed Physical Downlink Shared Channel(s) (HS-PDSCH(s)) Transmission Time Interval (TTI) in which the corresponding data streams are transmitted.

Figure 6:
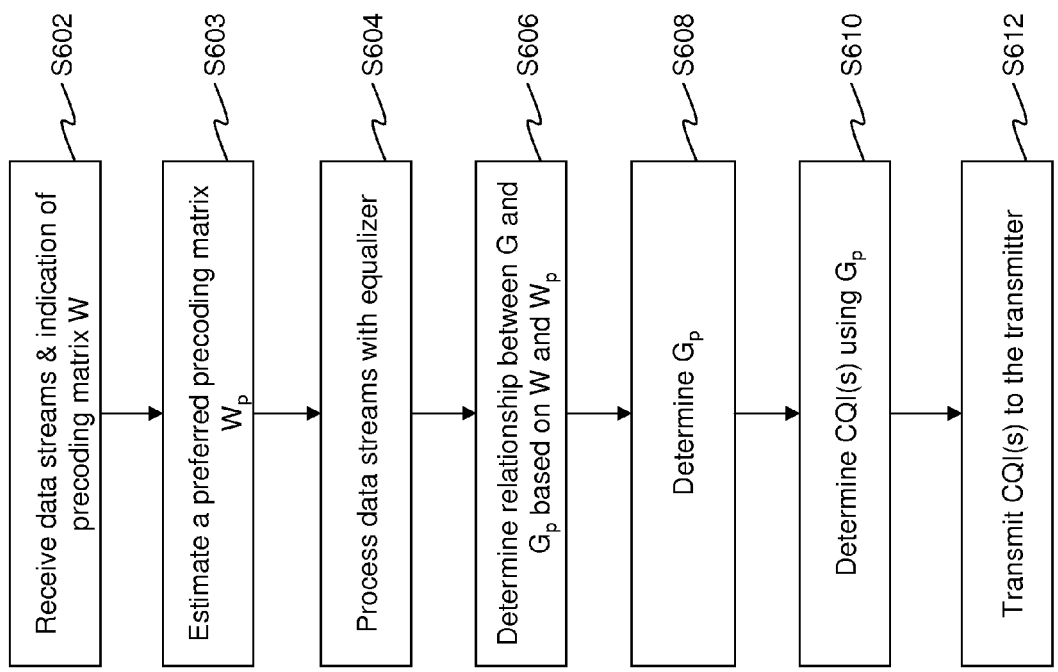
FIG. 6 illustrates a flow chart for an embodiment of a process of reporting CQI(s) from a receiver to a transmitter.

With reference to FIG. 6 there is described an embodiment of a method of reporting the CQI(s) from the UE 108 to the base station 102.

As described above, the base station 102 processes the data streams in a $N_{RX}$-by-$N_{TX}$ MIMO system (that is, a MIMO system having $N_{TX}$ transmit antennas and $N_{RX}$ receive antennas) using the transmission precoding matrix W, and transmits the N data streams to the UE 108. In step S602 the UE 108 receives the N data streams transmitted by the base station 102. The data streams are received wirelessly at the receive module 502 of the transceiver apparatus 402 at the UE 108.

Furthermore, in step S602 the UE 108 receives the indications of the values of W and N from the base station 102 along with other information e.g. on a High-Speed Shared Control Channel (HS-SCCH) as described above.

In step S603 the UE 108 estimates its preferred precoding matrix $W_p$. The UE 108 also estimates its preferred number of data streams $N_p$ to be transmitted by the base station 102.

In step S604 the UE 108 processes the received data streams using the signal processing module 506 which takes the values of W and N as inputs as well as the received data streams. In some embodiments described herein, the signal processing module 506 is a MIMO equaliser for the composite channel which decodes the transmit precoding implemented by the base station 102 using the precoding matrix W. The UE 108 calculates an equaliser coefficient for the equalisation of the received data signals.

The frequency domain MMSE MIMO equaliser function, F, of the equalizer 506 for the data signals can be expressed as:

$$F = R_{dd} W^H H^H (H W R_{dd} W^H H^H + \sigma_n^2 I)^{-1},$$

where the superscript H denotes a Hermitian transpose operation, the matrix H is a $N_{RX}$-by-$N_{TX}$ Multiple-Input Multiple-Output channel matrix between the base station 102 and the UE 108 in the frequency domain, $R_{dd} = E\{dd^H\}$ is the correlation matrix of the transmitted data signal given by the data vector d, $\sigma_n^2$ is the noise variance, and I is the identity matrix.

The effective channel G seen at the output of the equaliser 506 is expressed as:

$$G = FHW.$$

The CQI calculation is based on another effective channel expressed as:

$$G_p = F_p H W_p,$$

where $F_p = R_{dd} W_p^H H^H (H W_p R_{dd} W_p^H H^H + \sigma_n^2 I)^{-1}$ is the MMSE equaliser function for the precoded channel $HW_p$. In other words, $F_p$ is the equalizer function that would be seen at the equalizer 506 if $W = W_p$ and $N = N_p$, that is if the base station 102 used the preferred precoding matrix $W_p$ and transmitted $N_p$ data streams.

In the system described in the background section above, when $W_p = W$ and $N_p = N$, the UE 108 can directly estimate the CQI based on $G = FHW$ according to the definition of MIMO CQI. For all the other cases, i.e., when $W_p \neq W$ or $N_p \neq N$, the above expression of F and G cannot be directly used for the computation of CQI (since $G_p \neq G$), and the UE 108 needs to compute another equaliser function $F_p = R_{dd} W_p^H H^H (H W_p R_{dd} W_p^H H^H + \sigma_n^2 I)^{-1}$ and derive another effective channel $G_p = F_p H W_p$ that may only be for the purpose of CQI estimation.

In contrast according to embodiments disclosed herein, the effective channel $G_p$ can be determined by determining a relationship (e.g. a transformation) between G and $G_p$, wherein the relationship is based on the values of W and $W_p$. This provides a simple way to determine and report the CQI(s) from the UE 108 to the base station 102. For example, in some embodiments disclosed herein for any $N_{RX}$-by-$N_{TX}$ MIMO system, there is provided a way to estimate the CQI without the computation of $F_p$. This can be achieved by exploiting the following two facts. Firstly, in many practical cases, the transmitted data correlation matrix $R_{dd}$ can be approximated as a scaled identity matrix $\sigma_d^2 I$, where $\sigma_d$ represents the strength of the data signals. Secondly, for most of MIMO systems, $WW^H = I$.

With the above two facts in mind, the equaliser matrix F can be expressed as (either exactly when $R_{dd} = \sigma_d^2 I$ or approximately when $R_{dd}$ approximates to $\sigma_d^2 I$):

$$F = \sigma_d^2 W^H H^H (\sigma_d^2 H H^H + \sigma_n^2 I)^{-1} =$$

$$W^H H^H \left( H H^H + \frac{\sigma_n^2}{\sigma_d^2} I \right)^{-1} = W^H H^H (H H^H + \rho^{-1} I)^{-1},$$

where $$\rho = \frac{\sigma_d^2}{\sigma_n^2}$$

represents the signal-to-noise ratio (SNR).

Therefore, the time domain or frequency domain effective channel G can be expressed as:

$$G = FHW = W^H H^H (H H^H + \rho^{-1} I)^{-1} H W.$$

According to the definition of MIMO CQI, the −CQI shall be based on the effective channel $G_p$ which can be expressed in the same way as G except for replacing W with $W_p$. As $WW^H = I$, $G_p$ can be expressed as:

$$G_p = F_p H W_p = W_p^H H^H (H H^H + \rho^{-1} I)^{-1}$$
$$H W_p = W_p^H W W^H H^H (H H^H + \rho^{-1} I)^{-1}$$
$$H W W^H W_p = W_p^H W G W^H W_p,$$

Thus, $G_p$ can be expressed as a transformation of G:

$$G_p = (W_p^H W) G (W_p^H W)^H = T G T^H,$$

where $T = W_p^H W$.

In accordance with the equation given above, in step S606 a relationship is determined between G and $G_p$ based on W and $W_p$ according to $G_p = T G T^H$, where $T = W_p^H W$. By determining the value of T from $W_p$ and W the relationship between G and $G_p$ is determined. The UE 108 has estimated $W_p$ in step S603 and has received W from the base station 102 in step S602.

In step S608 the effective channel $G_p$ is determined using the relationship (e.g. transformation) determined in step S606 and the effective channel G at the output of the equalizer 506.

In some embodiments, the UE 108 always determines $G_p$ by applying the determined relationship between G and $G_p$, e.g. $G_p = T G T^H$ with $T = W_p^H W$ as described above.

In other embodiments, the UE 108 may first determine whether $R_{dd}$ is equal to, or can be approximated by, a scaled identity matrix. This determination is implemented either by receiving signalling from the base station 102 or by estimation of $R_{dd}$ at the UE 108. As described above, the method of determining $G_p$ by applying the determined relationship between G and $G_p$ is particularly advantageous when $R_{dd}$ is equal to, or can be approximated by, a scaled identity matrix. Therefore, the UE 108 may determine $G_p$ by applying the determined relationship between G and $G_p$ as described above responsive to determining that $R_{dd}$ is equal to, or can be approximated by, a scaled identity matrix. That is, whenever the UE 108 decides that $R_{dd}$ is equal to, or can be approximated by, a matrix proportional to a scaled identity matrix, the UE 108 will not need to directly compute $F_p$ and $G_p$ just for the purpose of CQI estimation even when $W_p$ is different to W. Instead, the UE 108 can simply determine $G_p$ by applying a transformation $G_p = T G T^H$. However, if the UE 108 determines that $R_{dd}$ is not equal to, and cannot be approximated by, a scaled identity matrix then the UE 108 may decide to directly compute $F_p$ and $G_p$. However, as described above, even when $R_{dd}$ is not equal to, and cannot be approximated by, a scaled identity matrix, it may, in some cases, still be advantageous to determine $G_p$ by applying the determined relationship between G and $G_p$ as described above since this may provide a reduced complexity (compared to directly computing $F_p$ and $G_p$) which may outweigh a disadvantage of performance degradation, which could be relatively small.

In step S610 the CQI is determined based on the value of $G_p$ determined in step S608. Therefore, the CQI is determined based on an effective channel $G_p$ that would be seen at the output of the equalizer 506 if the base station 102 used the preferred precoding matrix $W_p$ to process the data streams.

The implementation of the transformation $G_p = (W_p^H W) G (W_p^H W)^H = T G T^H$ can be done either in the frequency domain or in the time domain once the time domain G is estimated.

As, in some embodiments, the effective channel $G_p$ resulting from the transformation $G_p = (W_p^H W) G (W_p^H W)^H$ equals exactly or approximately to the $G_p$ that would be determined by first computing $F_p$ and then $G_p = F_p H W_p$, the transformation causes no or very little loss of accuracy.

In step S612 the determined CQI(s) for the $N_p$ channels are sent, with the preferred values of $W_p$ and $N_p$ from the UE 108 to the base station 102 on an uplink channel e.g. the HS-DPCCH channel for 3GPP WCDMA system. The number of CQIs that are determined and sent to the base station 102 is equal to $N_p$.

In the embodiments described above, the signal processing module 506 is a MIMO equalizer. However, the above relationship between G and $G_p$ can be extended to any other MIMO receiver architecture with a similar structure as the MMSE equalizer 506. For example, in other embodiments the UE 108 may be implemented as a symbol-level MMSE receiver based on a rake structure for a MIMO system, wherein the signal processing module 506 is a rake receiver processing module for the MIMO system.

Taking as an example, in a 2×2 MIMO system used by the 3GPP FDD WCDMA/HSDPA protocol, the considered MMSE symbol-rate receiver consists of a bank of Q descrambling/despreading blocks on each receive antenna, matched to different delays of the scrambling/spreading waveform of the code in use. Stacking the Q outputs of these blocks sampled at the symbol period results in a descrambled/despread vector expressed as:

$$y = HWd + n,$$

where the vector $d = [d_1, d_2]^T$ contains the 2 symbols during the current symbol period that share the same multicode, $H = [h_1\ h_2]$ is the Q×2 gain matrix which describes the MIMO channel and each gain vector $h_m$ describes the channel between the m-th transmitter and the dual-antenna receiver. The vector n describes the impairment process consisting of Intersymbol Interference (ISI), Multiple Access interference (MAI), and noise. The MMSE estimate of the symbol vector d is given by $\hat{d} = Fy$, where y is a vector of Q values sampled at the symbol period at the output of Q descramblers/despreaders, and F is a weight matrix of the rake receiver, given by:

$$F = R_{dd} W^H H^H (HW R_{dd} W^H H^H + \sigma_n^2 I)^{-1}.$$

This gives the same expression as the MIMO MMSE chip level equaliser described above, thus the same transformation between G and $G_p$ can also be applied for the symbol-level MIMO MMSE Rake receiver, as given above in relation to the MIMO equalizer.

There is also provided herein a simple way to implement the transformation $G_p = TGT^H$, where $T = W_p^H W$ for the 3GPP HSDPA 2×2 MIMO scheme as described in the 3GPP specification TS 25.214. In this case, W and $W_p$ is expressed in the following way:

$$W = \frac{\begin{bmatrix} 1 & 1 \\ e^{i\alpha} & -e^{i\alpha} \end{bmatrix}}{\sqrt{2}}, \text{ and}$$

$$W_p = \frac{\begin{bmatrix} 1 & 1 \\ e^{i\beta} & -e^{i\beta} \end{bmatrix}}{\sqrt{2}}.$$

Then, $$T = W_p^H W = \frac{\begin{bmatrix} 1 + e^{i(\alpha - \beta)} & 1 - e^{i(\alpha - \beta)} \\ 1 - e^{i(\alpha - \beta)} & 1 + e^{i(\alpha - \beta)} \end{bmatrix}}{2},$$

where $$\alpha = \frac{\pi}{4} + \frac{k\pi}{2}$$

with $k \in \{0, 1, 2, 3\}$, $$\beta = \frac{\pi}{4} + \frac{m\pi}{2}$$

$m \in \{0, 1, 2, 3\}$, and thus $$\alpha - \beta = \frac{(k-m)\pi}{2}.$$

Let $\delta = (k-m)$ modulo 4.

Let $$G = \begin{bmatrix} G_{11} & G_{12} \\ G_{21} & G_{22} \end{bmatrix}.$$

In this scenario, there are four cases to be considered, and hence the relationship (e.g. transformation) between G and $G_p$ is one of four possible options:

Case 1:
When $\delta = 0$, then $T_1 = I$, thus the relationship between $G_p$ and G is $G_p = G$. Therefore, no explicit transformation is needed and $G_p$ can be easily determined from G.

Case 2:
When $\delta = 1$, then $$T_2 = \frac{\begin{bmatrix} 1+i & 1-i \\ 1-i & 1+i \end{bmatrix}}{2},$$

thus the relationship between $G_p$ and G is given by the transformation $G_p = T_2 G T_2^H$. Therefore, one explicit transformation of the matrix G is required ($G_p = T_2 G T_2^H$) to determine $G_p$.

Case 3:
When $\delta = 2$, then $$T_3 = \begin{bmatrix} 0 & 1 \\ 1 & 0 \end{bmatrix},$$

thus the relationship between $G_p$ and G is given by $$G_p = T_3 G T_3^H = \begin{bmatrix} G_{22} & G_{21} \\ G_{12} & G_{11} \end{bmatrix}.$$

In this case no explicit transformation of G is needed to determine $G_p$, and instead $G_p$ is obtained by swapping the diagonal elements and the cross-diagonal elements of the matrix G. This is a simpler operation than performing a full matrix transformation operation.

Case 4:
When δ=3, let $$G_T = T_2 G T_2^H = \begin{bmatrix} G_{T11} & G_{T12} \\ G_{T21} & G_{T22} \end{bmatrix}.$$

As $$T_4 = \frac{\begin{bmatrix} 1-i & 1+i \\ 1+i & 1-i \end{bmatrix}}{4} = \begin{bmatrix} 0 & 1 \\ 1 & 0 \end{bmatrix} T_2,$$

thus the relationship between $G_p$ and G is given by:

$$G_p = \begin{bmatrix} 0 & 1 \\ 1 & 0 \end{bmatrix} T_2 G T_2^H \begin{bmatrix} 0 & 1 \\ 1 & 0 \end{bmatrix} =$$

$$\begin{bmatrix} 0 & 1 \\ 1 & 0 \end{bmatrix} \begin{bmatrix} G_{T11} & G_{T12} \\ G_{T21} & G_{T22} \end{bmatrix} \begin{bmatrix} 0 & 1 \\ 1 & 0 \end{bmatrix} = \begin{bmatrix} G_{T22} & G_{T21} \\ G_{T12} & G_{T11} \end{bmatrix}.$$

In this case one explicit transformation $G_T = T_2 G T_2^H$ is needed, then $G_p$ is obtained by swapping the diagonal elements and the cross-diagonal elements of $G_T$.

As such, in one embodiment only one explicit transformation is needed to be computed, that being $T_2 G T_2^H$ for Case 2 and Case 4 to determine the effective channel $G_p = F_p H W_p$ from the effective channel G=FHW. Therefore, the expensive computation of $F_p$ and $G_p$ for the purpose of the CQI calculation alone is avoided. Therefore, the time, processing requirements and power required to determine $G_p$ are reduced compared to the system described in the background section above. As described above, this can be achieved with no or little loss in the accuracy of the determination of $G_p$ when $R_{dd} = \sigma_d^2 I$. This is obtained using the realisation that the computation of the effective channel G of the signal processing module 506 (e.g. equalizer or rake receiver) can be simplified either in all cases, or only when the UE decides that $R_{dd}$ equals to either exactly or approximately to a scaled identity matrix $\sigma_d^2 I$ and $WW^H = I$. As an example, when two data streams are transmitted (i.e. when N=2) then the transmitted data correlation matrix $R_{dd}$ approximates to a scaled identity matrix $\sigma_d^2 I$ and $WW^H = I$.

The method steps described above and shown in FIG. 6 may be implemented at the UE 108 in software or hardware. For example, there may be provided a computer program product embodied on a non-transient computer-readable medium and configured so as when executed by the CPU 110 of the UE 108 to implement the methods described herein. The execution of the computer program product may implement suitable software algorithms for implementing the methods described herein at the UE 108. The computer program product may be stored in the memory 112 of the UE 108.

In the embodiments described above, the transmitter of the data streams is the base station 102 and the receiver of the data streams is the UE 108. However, in other embodiments, the transmitter and the receiver may be other elements in the wireless network. For example, the same methods could be implemented with the UE 108 being the transmitter of the data streams and the base station 102 being the receiver of the data streams.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method of reporting at least one channel quality indicator from a receiver to a transmitter, the method comprising operations implemented at the receiver of:
    receiving one or more data streams transmitted by the transmitter in a Multiple-Input Multiple-Output system, wherein the data streams are processed by the transmitter using a transmission precoding matrix W prior to transmission of the data streams to the receiver;
    estimating a preferred precoding matrix $W_p$ which is preferred by the receiver;
    processing the received data streams with a signal processing module using the transmission precoding matrix W, such that the effective channel G at the output of the signal processing module is dependent upon the transmission precoding matrix W used by the transmitter;
    determining a second effective channel $G_p$ which is based on the preferred precoding matrix $W_p$ by:
        (i) determining a relationship between the effective channel G and the second effective channel $G_p$ based on the transmission precoding matrix W and the preferred precoding matrix $W_p$; and
        (ii) using the determined relationship and the effective channel G at the output of the signal processing module to determine the second effective channel $G_p$;
    using the determined second effective channel $G_p$ to determine the at least one channel quality indicator; and
    transmitting the determined at least one channel quality indicator to the transmitter.

2. The method of claim 1 wherein the receiver is a user equipment and the transmitter is a base station.

3. The method of claim 1 further comprising determining whether a transmitted data correlation matrix $R_{dd}$ is equal to, or can be approximated as, a scaled identity matrix $\sigma_d^2 I$, where $\sigma_d$ represents the strength of the received data streams,
    wherein responsive to determining that the transmitted data correlation matrix $R_{dd}$ is equal to, or can be approximated as, a scaled identity matrix $\sigma_d^2 I$ said determining a second effective channel $G_p$ is implemented by said (i) determining a relationship between the effective channel G and the second effective channel $G_p$, and said (ii) using the determined relationship and the effective channel G at the output of the signal processing module to determine the second effective channel $G_p$.

4. The method of claim 1 further comprising receiving an indication of the number of data streams transmitted from the transmitter in the Multiple Input Multiple Output system to the receiver.

5. The method of claim 1 wherein an indication of the transmission precoding matrix W is received by the receiver from the transmitter on a control channel.

6. The method of claim 1 wherein the step of processing the received data streams with a signal processing module comprises implementing a Minimum Mean Square Error estimation.

7. The method of claim 6 wherein the signal processing module is one of: (i) a Multiple-Input Multiple-Output equalizer, and (ii) a rake receiver processing module for the Multiple-Input Multiple-Output system.

8. The method of claim 1 wherein said relationship is a transformation between the effective channel G and the second effective channel $G_p$.

9. The method of claim 8 wherein the transformation is given by:

$$G_p = TGT^H,$$

where $T = W_p^H W$, and where the superscript H denotes a Hermitian transpose operation.

10. The method of claim 1 wherein the effective channel G is given by:

$$G = FHW,$$

where the matrix H is a Multiple-Input Multiple-Output channel matrix between the transmitter and the receiver in the frequency domain, and where:

$$F = W^H H^H (HH^H + \rho^{-1} I)^{-1},$$

where the superscript H denotes a Hermitian transpose operation, I is the identity matrix and $\rho$ represents the signal to noise ratio between the transmitter and the receiver.

11. The method of claim 1 wherein the number of data streams transmitted from the transmitter in the Multiple Input Multiple Output system to the receiver is two.

12. The method of claim 11 wherein the transmission precoding matrix W and the preferred precoding matrix $W_p$ are given by:

$$W = \frac{1}{\sqrt{2}} \begin{bmatrix} 1 & 1 \\ e^{i\alpha} & e^{-i\alpha} \end{bmatrix} \text{ and } W_P = \frac{1}{\sqrt{2}} \begin{bmatrix} 1 & 1 \\ e^{i\beta} & e^{-i\beta} \end{bmatrix},$$

where $$\alpha = \frac{\pi}{4} + \frac{k\pi}{2}$$

and $$\beta = \frac{\pi}{4} + \frac{m\pi}{2},$$

and where $k \in \{0, 1, 2, 3\}$ and $m \in \{0, 1, 2, 3\}$,
 and wherein the step of determining a relationship between the effective channel G and the second effective channel $G_p$ comprises determining a value of $\delta$, where:

$$\delta = (k-m) \text{ modulo } 4.$$

13. The method of claim 12 wherein:
 if $\delta=0$ the receiver determines the second effective channel $G_p$ according to a relationship $G_p = G$;
 if $\delta=1$ the receiver determines the second effective channel $G_p$ according to a relationship $G_p = T_2 G T_2^H$, where $$T_2 = \frac{1}{2} \begin{bmatrix} 1+i & 1-i \\ 1-i & 1+i \end{bmatrix};$$

if $\delta=2$ the receiver determines the second effective channel $G_p$ according to a relationship $G_p = T_3 G T_3^H$, where $$T_3 = \begin{bmatrix} 0 & 1 \\ 1 & 0 \end{bmatrix};$$

and
 if $\delta=3$ the receiver determines the second effective channel $G_p$ according to a relationship $$G_P = \begin{bmatrix} 0 & 1 \\ 1 & 0 \end{bmatrix} T_2 G T_2^H \begin{bmatrix} 0 & 1 \\ 1 & 0 \end{bmatrix}.$$

14. The method according to claim 1 wherein the effective channel G and the second effective channel $G_p$ are in one of: (i) the frequency domain, and (ii) the time domain.

15. A receiver configured to report at least one channel quality indicator to a transmitter, the receiver comprising:
 transceiver apparatus configured to receive one or more data streams transmitted by the transmitter in a Multiple-Input Multiple-Output system, wherein the data streams are processed by the transmitter using a transmission precoding matrix W prior to transmission of the data streams to the receiver;
 a signal processing module configured to process the received data streams using the transmission precoding matrix W, such that the effective channel G at the output of the signal processing module is dependent upon the transmission precoding matrix W used by the transmitter; and
 processing apparatus configured to:
 estimate a preferred precoding matrix $W_p$ which is preferred by the receiver;
 determine a second effective channel $G_p$ which is based on the preferred precoding matrix $W_p$ by:
 (i) determining a relationship between the effective channel G and the second effective channel $G_p$ based on the transmission precoding matrix W and the preferred precoding matrix $W_p$; and
 (ii) using the determined relationship and the effective channel G at the output of the signal processing module to determine the second effective channel $G_p$; and
 use the determined second effective channel $G_p$ to determine the at least one channel quality indicator,
 wherein the transceiver apparatus is further configured to transmit the determined at least one channel quality indicator to the transmitter.

16. The receiver of claim 15 wherein the receiver is a user equipment and the transmitter is a base station.

17. The receiver of claim 15 wherein the signal processing module is one of: (i) a Multiple-Input Multiple-Output equalizer, and (ii) a rake receiver processing module for the Multiple-Input Multiple-Output system.

18. The receiver of claim 16 wherein the signal processing module is one of: (i) a Multiple-Input Multiple-Output equalizer, and (ii) a rake receiver processing module for the Multiple-Input Multiple-Output system.

19. A computer program product configured to report at least one channel quality indicator from a receiver to a transmitter, the computer program product being embodied on a non-transient computer-readable medium and configured so as when executed by a processor of the receiver to implement the operations of:

receiving one or more data streams transmitted by the transmitter in a Multiple-Input Multiple-Output system, wherein the data streams are processed by the transmitter using a transmission precoding matrix W prior to transmission of the data streams to the receiver;

estimating a preferred precoding matrix $W_p$ which is preferred by the receiver;

processing the received data streams with a signal processing module using the transmission precoding matrix W, such that the effective channel G at the output of the signal processing module is dependent upon the transmission precoding matrix W used by the transmitter;

determining a second effective channel $G_p$ which is based on the preferred precoding matrix $W_p$;

using the determined second effective channel $G_p$ to determine the at least one channel quality indicator; and transmitting the determined at least one channel quality indicator to the transmitter.

20. The computer program product of claim 19 wherein said determining a second effective channel $G_p$ based on the preferred precoding matrix $W_p$ includes:

(i) determining a relationship between the effective channel G and the second effective channel $G_p$ based on the transmission precoding matrix W and the preferred precoding matrix $W_p$; and (ii) using the determined relationship and the effective channel G at the output of the signal processing module to determine the second effective channel $G_p$.

* * * * *